United States Patent
Lang

[15] 3,698,685
[45] Oct. 17, 1972

[54] ANIMAL ACTUATED DRINKING VALVE

[72] Inventor: Ronald A. Lang, Madison, Wis.

[73] Assignee: Waters Mfg. Co., Inc., Madison, Wis.

[22] Filed: March 8, 1971

[21] Appl. No.: 122,032

[52] U.S. Cl............251/303, 137/DIG. 4, 119/72.5
[51] Int. Cl..........................A01k 7/00, F16k 51/00
[58] Field of Search..251/303, 339; 137/217, DIG. 4; 119/72.5, 75

[56] References Cited

UNITED STATES PATENTS

| 3,582,006 | 6/1971 | Thompson | 251/303 |
| 2,270,838 | 1/1942 | Langdon | 137/217 |
| 3,263,652 | 8/1966 | Nakajima et al | 119/72.5 |
| 3,550,560 | 12/1970 | Edstrom | 119/72.5 |

*Primary Examiner*—Henry T. Klinksiek
*Attorney*—Joseph G. Werner, Theodore J. Long, John M. Winter and James A. Kemmeter

[57] ABSTRACT

An animal actuated drinking valve having a tubular body member encasing an actuating pin with a rear flange portion which is urged forwardly by an elongate resilient biasing member to create a releasable liquid-tight seal with an O-ring in the tubular body member. In use, an animal nudges the protruding actuating stem portion of the pin causing the rear flange portion to unseat from the O-ring allowing water to flow through the valve.

1 Claim, 6 Drawing Figures

PATENTED OCT 17 1972 3,698,685

INVENTOR
RONALD A. LANG

ANIMAL ACTUATED DRINKING VALVE

BACKGROUND OF THE INVENTION

1. Field of the Invention

This invention pertains generally to a valve for controlling the flow of liquids and more particularly to an animal actuated drinking valve for providing liquids to caged animals under low fluid pressure.

2. Description of the Prior Art

Research laboratories utilize large numbers of experimental animals isolated in individual cages for observation and experimentation. These animals are frequently small such as guinea pigs, rabbits, monkeys, rats and the like. Such animals require water several times a day, yet they are highly susceptible to drowning even by relatively small quantities of water.

Since water cannot safely be stored within the animals' cages it must be provided externally in a quantity sufficient to sustain the animals without allowing an accumulation large enough to drown them. It is impractical, if not impossible to provide this water by hand. Resort has been made, therefore, to animal actuated drinking valves.

Early animal actuated drinking valves relied upon steel springs to maintain a liquid tight seal so as to prevent water leakage. However, the steel springs would eventually corrode and become inoperative. There was, therefore, danger of unknowingly depriving the animals of water or worse yet, of drowning them due to failure of spring to properly seal the water supply.

Later art such as the U.S. Patent to Allen No. 3,507,255 reveals that nonmetallic devices have also been utilized to secure a water tight seal. While the Allen valve may not be subject to corrosion, it depends on a substantially axial inward movement of the actuating pin for release of water which makes it more difficult for the animal to actuate than a valve that can be unseated by tipping the actuating stem such as in the U.S. Patent to Alter No. 3,128,745. The Alter valve has no biasing member at all but is closed by water pressure and is therefore, prone to leakage, especially at low water pressures. Leakage alone has been found to create danger of drowning research animals in solid bottom cages.

SUMMARY OF THE INVENTION

Because the accidental drowning of a few of these animals might negate months or even years of continuous research, I have invented a new and improved animal actuated drinking valve which is simple in construction, faithful in response, and one that will not corrode or leak so as to endanger the lives of research animals.

My unique construction combines the preferred features of a valve that can be opened by tipping of the actuating pin and one that is tightly sealed against leakage by a resilient biasing member.

Sealing Sealing engagement within the drinking valve is made between an O-ring and the rear flange portion of a pin having a forwardly disposed actuating stem protruding slightly from the body member of the valve. An elongate non-corrosive resilient biasing member maintains a constant and equalized force on the rear flange portion of the actuating pin to assure a positive sealing force even at low liquid pressures, i.e., no minimum liquid pressure is required for assistance in sealing.

The actuating stem portion is sufficiently smaller in cross section than that portion of the passageway through which it extends so that an animal may impart sufficient lateral tilting thereto to tip the sealing flange to open the valve and thus obtain water.

The resilient biasing member has a reduced diameter forward portion which is readily laterally deflectable so that the resilient closing force exerted axially forward against the sealing flange of the actuating pin by the biasing member is turned aside by the tilting action of the pin to permit the heretofore unachieved combined features of easy opening and tight sealing.

Other objects, features and advantages of my invention will be apparent from the following detailed description taken in conjunction with the accompanying drawings wherein a preferred embodiment of the invention has been selected for exemplification.

DESCRIPTION OF THE PREFERRED EMBODIMENT

Figure 2:
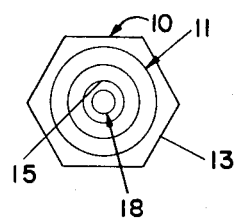
FIG. 2 is a front elevation of the valve assembly of FIG. 1.
Figure 1:
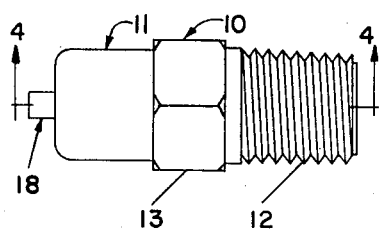
FIG. 1 is a side elevation of a valve assembly exemplifying my invention.
Figure 3:
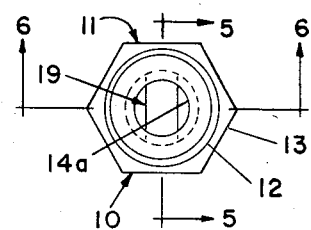
FIG. 3 is a rear elevation of the valve assembly of FIG. 1.

Referring now more particularly to the drawings, wherein like numerals refer to like parts throughout the several views, my animal actuated drinking valve is shown generally at 10 in FIGS. 1–6.

The housing of the valve 10 comprises a tubular body member 11 of stainless steel having an externally threaded rear portion 12 and a hexagonal middle portion 13 for gripping with a wrench. A longitudinal passageway 14 contains an annular flanged portion 14a circumscribing the rear opening of the passageway 14. The flanged portion 14a has a diameter somewhat smaller than that of the passageway 14. A reduced front portion 15 of the passageway 14 forms and annular shoulder 16.

Figure 4:
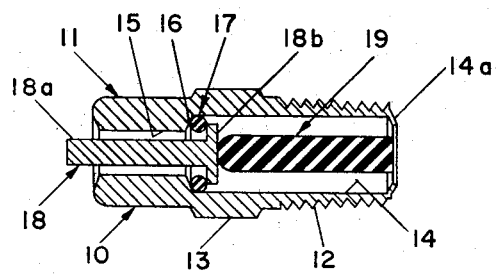
FIG. 4 is a section view taken along line 4—4 in FIG. 1.
Figure 5:
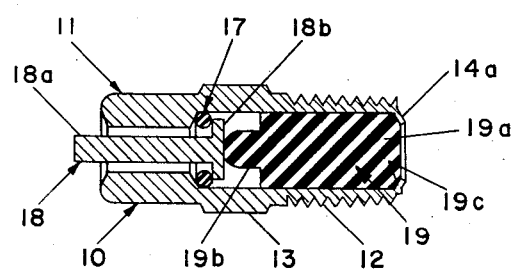
FIG. 5 is a section view taken along line 5—5 in FIG. 3.

A rubber-compound O-ring 17 is seated against the annular shoulder 16. A pin 18, preferably of stainless steel, has an actuating stem 18a extending forwardly through the O-ring 17 and the reduced front portion 15 of the passageway 14. The flange portion 18b of the pin 18 is substantially flat and circular in shape and is positioned rearwardly of the O-ring 17 for sealing engagement thereagainst as shown in FIGS. 4 and 5.

An elongate resilient silicone rubber biasing member 19 is positioned in the passageway 14 rearwardly of the pin 18. The main body portion 19a of the biasing member 19 is generally rectangular in shape and engages the inside surface of the tubular body member 11 to position the biasing member 19 centrally within the passageway 14. The rear surface 19c of the biasing member 19 is engaged against the annular flanged projection 14a circumscribing the passageway for maintaining the biasing member against displacement.

It should be noted that the biasing member 19 has a cross-sectional area everywhere within the passageway 14 smaller than that of the passageway 14 in order to provide a flow path alongside the biasing member.

Figure 6:
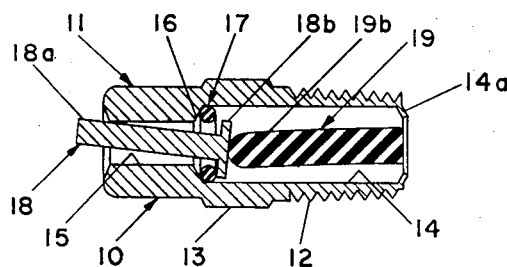
FIG. 6 is a section view taken along line 6—6 in FIG. 3, similar to FIG. 4, showing the valve in open position.

A reduced forward portion 19b of the biasing member 19 is cylindrical in shape and engages the rear surface of the sealing flange 18b of pin 18 and normally urges the flange into liquidtight sealing engagement with the O-ring 17. The diameter of portion 19b is substantially smaller than that portion of the passageway through which it extends to permit deflection as shown in FIG. 6.

The resilient force of the biasing member 19 provides a constant pressure on the sealing flange portion 18b of the pin 18. This force is sufficient to maintain a constant liquid-tight seal without dependence upon any minimum water pressure. It was found that the drinking valve 10 using a silicone rubber biasing member 19 will operate effectively over a pressure range between 0–30 psi, but a constant pressure between 5–10 psi is considered the best range.

Ease of activating the drinking valve by the animal has not been sacrificed by the positive sealing feature since the actuating stem 18a of the pin 18 has only to be gently nudged in any direction for good water flow. As best shown in FIG. 6, slight lateral tilting of the actuating stem 18a by the animal causes the flange 18b to be tipped away from the O-ring 17. Moreover since the biasing member 19 has an elongate narrowed forward portion 19b which is easily flexed to the side, the resilient force directed forwardly against pin 18 is easily turned aside by this same tipping motion of the pin 18.

In operation, therefore, the animal has only to nudge the actuating stem 18a in any direction and sealing flange 18b will unseat by tipping away from the O-ring 17 and a good liquid flow will be obtained. When the animal releases the actuating stem 18a the biasing member 19 will cause the pin 18 to return to its normal closed position.

It is understood that my invention is not confined to the particular construction and arrangement of parts herein illustrated and described, but embraces all such modified forms thereof as come within the scope of the following claims.

I claim:

1. An animal actuated drinking valve for providing liquids to caged animals comprising:
   a. A unitary tubular body member having a longitudinal passageway therethrough with a reduced portion forming a rearwardly facing shoulder within said passageway,
   b. an O-ring of resilient material seating against said shoulder,
   c. a pin having an actuating stem portion and rear flange portion, said rear flange portion positioned rearwardly of said O-ring for sealing engagement thereagainst, said stem portion extending through said O-ring and the reduced portion of said tubular body member, said stem portion being sufficiently smaller in cross-section than the reduced portion of said tubular body member to permit sufficient lateral tilting of said stem portion therein to unseat a portion of said flange from said O-ring,
   d. an elongate biasing member of resilient material positioned in said passageway rearwardly of said pin, said resilient biasing member having a main body portion engaging the inside surface of the tubular body member to position said biasing member centrally within said passageway and having a laterally deflectable reduced forward portion engaging the rear flange portion of said pin and normally urging said flange portion into liquid-tight sealing engagement with said O-ring, at least a portion of said biasing member being spaced from the inside surface of said tubular body member to provide a flow path along said biasing member through said passageway, and
   e. an inwardly directed annular flange at the rear of said tubular body member circumscribing said passageway and engaging the main body portion of said biasing member for maintaining said biasing member against rearward axial displacement.

* * * * *